United States Patent [19]

Wiessner et al.

[11] 4,172,651

[45] Oct. 30, 1979

[54] SINGLE LENS MIRROR REFLEX CAMERA WITH AUTOMATED APERTURE AND TIMING CONTROL

[75] Inventors: Willi Wiessner, Wetzlar; Fritz Keiner, Ehringshausen; Rolf Magel, Steinbach, all of Fed. Rep. of Germany

[73] Assignee: Ernst Leitz Wetzlar GmbH, Wetzlar, Fed. Rep. of Germany

[21] Appl. No.: 943,802

[22] Filed: Sep. 19, 1978

[30] Foreign Application Priority Data

Oct. 8, 1977 [DE] Fed. Rep. of Germany ....... 2745398

[51] Int. Cl.² .................. G03B 17/14; G03B 17/20
[52] U.S. Cl. ......................... 354/289; 354/46; 354/60 L; 354/286
[58] Field of Search .............. 354/53, 54, 60 E, 60 L, 354/286, 289, 46

[56] References Cited

U.S. PATENT DOCUMENTS

| | | | |
|---|---|---|---|
| 3,427,946 | 2/1969 | Broschke et al. | 354/46 |
| 4,118,726 | 10/1978 | Kuramoto et al. | 354/289 |

*Primary Examiner*—Michael L. Gellner
*Attorney, Agent, or Firm*—Gilbert L. Wells

[57] ABSTRACT

A single lens mirror reflex camera with spring biased diaphragm and with exposure metering and controlling system having a central operation mode selection switch for switching between several operation modes, is improved by providing indicators at the camera which are switched in when the "automatic aperture" operation mode is selected and are recognized as warning displays by the user, and by providing switching means at the stop preselection ring of the objective and at the camera, which turn off the indicators in the camera proper when the smallest aperture is set at the stop preselection ring.

14 Claims, 9 Drawing Figures

SINGLE LENS MIRROR REFLEX CAMERA WITH AUTOMATED APERTURE AND TIMING CONTROL

CROSS REFERENCE TO A RELATED APPLICATION

Applicants claim priority under 35 USC 119 for application P 27 45 298.1 filed Oct. 8, 1977 in the Patent Office of the Federal Republic of Germany.

BACKGROUND OF THE INVENTION

The present invention relates to a single lens mirror reflex camera with a spring biased diaphragm having an exposure metering and controlling system switchable over several operation modes.

The state of the art of such cameras may be ascertained by reference to West German Pat. Nos. 1,266,636 and 1,282,442; West German Published Application No. 2,316,261 and U.S. Pat. Nos. 3,427,946; 3,603,234; and 4,080,611, the disclosures of which are incorporated herein.

It is known in cameras of this type to measure the exposure either integrally or selectively, that is, to measure the brightness of the entire image field or only part of it, and it is further known to switch the exposure metering system over the two modes of measurement.

Again it is known, as regards such a camera:

(a) to provide manual setting of time and aperture;
(b) to provide timing automation (in which the aperture is preselected and timing is automatically set); and
(c) to provide aperture automation (in which the timing is preselected and the aperture is automatically set corresponding to the particular object brightness).

An operation mode selection switch may be provided at the camera for the various operation modes.

Such a camera is known from U.S. Pat. No. 4,080,611, in which a series of light-emitting diodes is provided at the rim of the viewer field which displays the timing or aperture automatically set, and which is opposite an appropriate scale for timing automation and for aperture automation respectively, depending on the selected operation mode.

Regardless whether there be a display, electronic or other, of the operation mode selected, the setting of such a camera to the aperture operation mode however assumes, for faultless operation, that the aperture preselection ring of the objective is set for the smallest aperture, thus allowing any stop value being automatically set. If any larger stop had been selected at the aperture preselection ring, there might be the requirement—depending on the preselected timing and object brightness—of setting to an aperture smaller than the randomly selected one. This however would be impossible in that case, because the automatically running diaphragm adjustment motion would already be stopped at a larger setting.

Obviously the instructions for use of the camera can and do include the warning that when one selects the operation mode of "automatic aperture", it should be based on preselecting the smallest aperture possible at the stop preselection ring. But it is common experience that such instructions are merely hastily read and easily forgotten, in any event, they are too often ignored.

There is the possibility of forcing the user to heed such instructions, particularly as regards cameras with built in objectives, by so interlocking the operation mode of "automatic aperture" with the stop preselection ring that the position "automatic aperture" is always located on the safe side of the smallest aperture stop marked on the pre-set aperture ring. When the operation mode "automatic aperture" is selected in such an embodiment, the stop preselection ring is automatically rotated through the smallest stop and therefore the entire range of stops is open to the adjustment motion of the diaphragm.

However, such a solution is impracticable when the camera accepts interchangeable lenses or when more than two operation modes can be selected, for instance "automatic aperture", "automatic timing" and "manual setting of time and aperture". In such a case one operation mode at least would require an additional selection switch. This would however contradict the effort of providing only one switch at the camera for all the possible operation modes.

SUMMARY OF THE INVENTION

Having in mind the limitations of the prior art, it is an object of the present invention to provide means in a camera with a single selection switch for all operation modes indicating to the user when he selects "automatic aperture" whether the stop preselection ring is in the position of the smallest aperture or whether this yet must be done.

The object is accomplished by the present invention by providing first means in the camera, which are operationally inserted in the case of the "automatic aperture" operation mode selection and which will be noted as a warning by the user, and in that second means are provided at the stop preselection ring of the objective, which again eliminate the first means from operation when the smallest stop is selected at the stop preselection ring.

These means may be both mechanical and electrical. For instance the warning display may consist of a pin forced out of the camera housing upon setting the operation mode selector switch and drawing the user's attention to the fact that the stop preselection is not set for the smallest aperture. The pin is moved back when the preselection ring is set to the smallest stop. Such a warning display is easily implemented with a pin resting on a double-arm lever, of which one end is actuated by the mode-selection switch and the other by the stop preselection ring.

However, in modern cameras, as a rule the selected mode operation is displayed in the viewer, for instance, by the lighting of a corresponding light-emitting-diode (LED). It is therefore contemplated in the present invention that the warning display be combined with the LED to indicate the "automatic aperture" operation mode, or to use this LED itself as the warning display. This may be implemented for instance so that this LED blinks in the case where the "automatic aperture" operation mode has been selected but the stop preselection ring is not as yet set to the smallest aperture. Only after this condition has been met the LED will glow steadily. To that end a frequency generator is provided in the camera, of which the potential is applied to the base of a transistor in the LED circuit, whereby this LED at first glows intermittently. This transistor is in parallel with a switch which is closed by the stop preselection ring when in its position of smallest aperture. This shunts the transistor and the LED glows steadily.

However, a difficulty arises both as regards the use of electrical warning devices as well as for mechanical ones in mirror reflex cameras with interchangeable lenses of different maximum apertures, in which cameras the setting of the stop preselection ring is always the same as the particular maximum aperture with respect to the camera housing on account of metering and controlling of exposure, for instance as indicated in U.S. Pat. No. 3,427,946.

This difficulty arises because the total angle of rotation of the stop preselection ring of these objectives is not the same for each objective, rather it is different, depending on the number of stops provided by the objective. However, as stated above, as the setting of the largest stop is the same for all objectives in all stop preselecting rings, it follows that the angle of rotation to the position where the smallest stop is preselected is not always the same, rather it is different. On the other hand the switch or the mechanical element which is actuated when the setting is made for the smallest stop always necessarily is at the same location in the camera, whereby there results a difficulty in actuating this switch or element.

This difficulty is eliminated by a further proposal, namely to provide a control member cooperating with the mechanical warning element, or the switch, on the side of the camera, at the stop preselecting ring of every interchangeable lens or objective, and to mount the control member so that its angular separation from the warning element, or switch, for preselected largest aperture shall always be equal to the total angle of rotation of the stop preselecting ring.

The control member on the side of the objective may directly act on the mechanical warning element, or switch, in this manner; otherwise, an intermediate member may also be provided on the side of the camera. A ring concentrically rotating about the axis of the objective is used as such in an intermediate member, being acted on by the control member on the side of the objective and in turn actuating the warning element or the switch.

Now it is known according to such cameras to mount a first limit surface to the stop preselection ring for the purpose of feeding the preselected stop value to the control and exposure metering circuit and which surface—regardless of the largest aperture of the objective—will always be located in the same initial position relative to the camera body for every objective when the largest aperture has been preselected. This is known from German Pat. No. 1,266,636 and U.S. Pat. Nos. 3,427,946 and 3,603,234. Furthermore, it is already known from German Pat. No. 1,266,636 and U.S. Pat. No. 3,603,234 to provide a second limit surface at the stop preselecting ring or operationally connected with it, the position of this second surface being the same for all objectives if the same maximum aperture was selected, regardless of what the particular maximum aperture might be. This second limit surface is used to display the preselected stop in the camera viewer or in another arbitrary window.

This second limit surface can be used simultaneously in a simple manner as that limit surface actuating the mechanical warning element or the switch. However, this is feasible only when all interchangeable lenses have the same smallest stop, for instance all have an f/number of 16 or 22. If, however, the faster objectives only go as far as f/16, as is frequently the case, while the somewhat slower lenses go as far as f/22, then this second limit surface cannot be immediately used to actuate the warning element or the switch. This is so because this limit surface would move by another stop for those objectives with an additional one.

Where such objectives are involved, this difficulty is solved by the present invention in that the intermediate member on the side of the camera is divided into two parts, where the first part is set by the first limit surface and the second part by the second limit surface, in that furthermore the first part comprises several movable drivers each arranged offset by the interval of an aperture stop, which can be switched in or out and act on the warning element or switch, and in that the second part is provided with a fixed driver switching in the movable drivers when the first and second parts are adjusted with respect to each other, and in that for switching at least one of the movable drivers can be engaged by the fixed driver in two adjacent but different positions.

A further embodiment of the present invention therefore consists in that, depending on need, one of the movable drivers is provided with two neighboring sites either of which can be engaged by the fixed driver. Thus the switching movement of one of the movable drivers is caused by two different positions of the fixed driver.

It is especially proposed to configure the two-part intermediate member on the side of the camera in the form of two rings concentric with the optic axis, one of these rings being equipped with the movable drivers and the other with the fixed one for driving the movable ones.

BRIEF DESCRIPTION OF THE DRAWINGS

Several embodiments of the invention are shown in the appended drawings, wherein.

DESCRIPTION OF THE PREFERRED EMBODIMENTS

Figure 1:
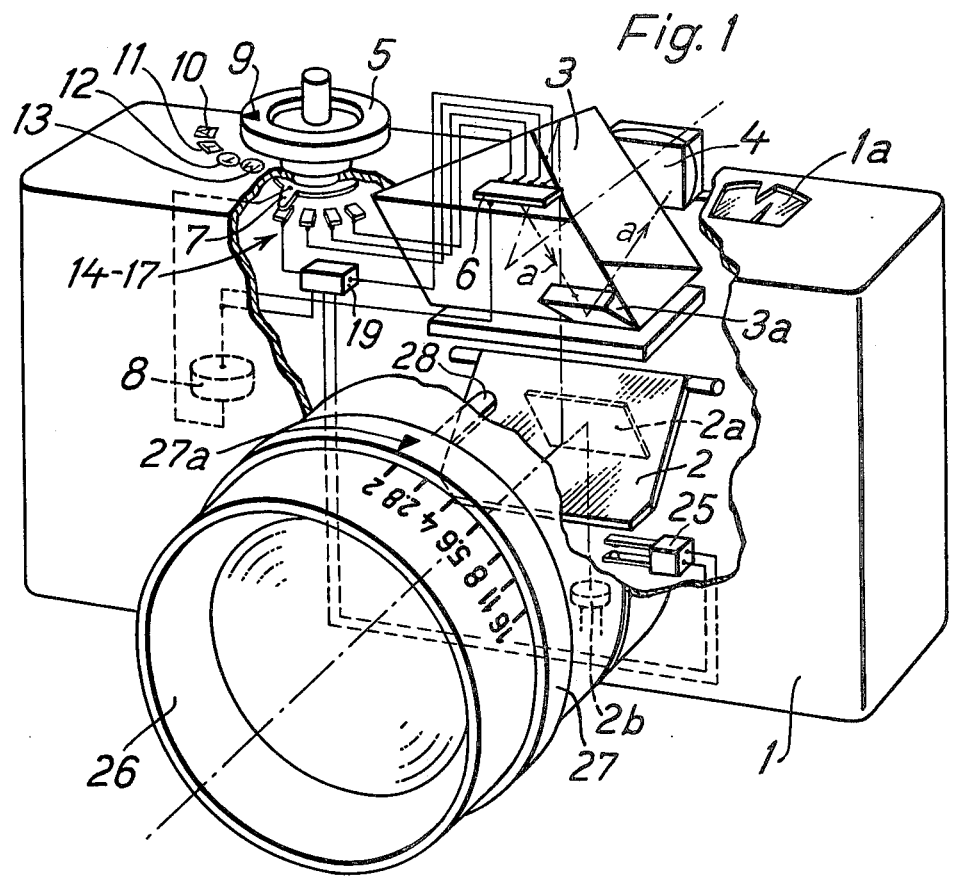
FIG. 1 is a schematic or perspective view of a mirror reflex camera of the present invention with an operation mode switch and an LED display in the viewer.

With particular reference to FIG. 1, camera body 1 is shown which conventionally holds among other things as for instance an exposure metering system consisting of auxiliary mirror 2a, photoreceiver 2b and metering display 1a, a reflex mirror 2, a pentaprism 3 and an ocular 4.

A rotating knob representing the operation mode selection switch 5 is shown at the top of the camera body. By rotating this switch 5, the user of the camera can choose between the modes of "automatic aperture", "automatic timing with integrated exposure metering", "automatic timing with selective exposure metering" and "manual setting time and aperture".

The operation modes themselves and the means implementing them are not objects of the invention and therefore not shown in further detail.

An LED row 6 is provided to display the selected operation mode in the viewer, containing a particular LED for each mode which lights up when selected. The light of the lit diodes is guided through an accessory prism 2a and penta-3 into the viewer beam in the direction of arrows a.

To ensure that the proper diode lights up, a wiper 7 rotates with switch 5, connected at one end to one terminal of battery 8 and upon rotation of switch 5 making contact with other terminals leading to the individual LED's in row 6. An index mark 9 is placed on switch 5, indicating the selected operation modes at opposite corresponding symbols on the camera body.

Figure 2:
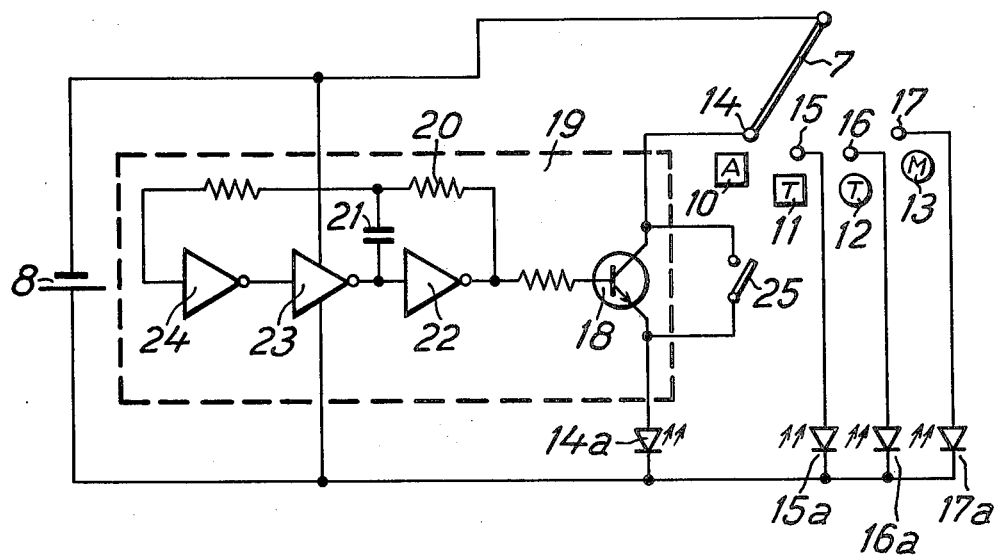
FIG. 2 is a circuit diagram, particularly of the LED displaying the operation mode "automatic aperture" of FIG. 1.

These symbols are shown more clearly in FIG. 2, to wit symbol 10 represents "automatic aperture", symbol 11 "automatic timing with integrated exposure measurement", symbol 12 "automatic timing with selective measurement" and symbol 13 "manual setting for timing and aperture". These symbols are associated with contacts 14, 15, 16, 17 of the corresponding LED's 14a, 15a, 16a, 17a. Wiper 7 passes over these contacts, so that each time contact is made a particular LED lights up.

As already explained, it is not enough when selecting the operation mode "automatic aperture" that the operation mode switch 5 be merely set to symbol 10(=A), rather the smallest stop must be simultaneously selected at the stop preselecting switch, to allow the diaphragm actuation ring to rotate if necessary through the entire range of stop settings. Therefore means must be provided which act as warning displays to alert the user when required that the stop preselection ring has not yet been set to the smallest aperture.

In the embodiment of FIGS. 1 and 2, the LED 14a indicating the "automatic aperture" operation mode itself is such a warning display. The entire circuit, shown in FIG. 2, is denoted by 19 and shown as a block in FIG. 1. LED 14a blinks for the "automatic aperture" setting as long as the stop preselecting ring remains in a position other than that of the smallest aperture and thereby warns the user. Only when the user sets the stop preselection ring to the smallest aperture the LED will cease blinking and thereafter glow steadily, thereby indicating operational readiness.

To that end, LED 14a is not directly in the circuit of battery 8, rather as shown in FIG. 2, it is in series with a transistor 18, the base of which is controled by a frequency generator. This generator consists of an RC circuit 20, 21 in the feedback loop of several operational amplifiers 22, 23, 24. The pulse train from this generator causes the transistor 18 to be alternatingly conducting and non-conducting, whereby LED 14a is made to blink.

Transistor 18, however, is shunted by a switch 25. When this switch is closed, LED 14a is directly in the circuit of battery 8, thereby unaffected from the generator pulses, and the LED accordingly glows steadily.

Switch 25 is mounted in the camera in the region of the objective 26. This objective comprises in conventional manner a stop preselecting ring 27 with a fixed driver 28 which will close switch 25 when the stop preselecting ring is rotated into the position of smallest aperture.

Thus, when "automatic aperture" operation mode is set at the operation mode switch 5, as shown also in FIG. 2, LED 14a glows intermittently when switch 25 is open and steadily when it is closed. The switch 25 is closed only when the stop preselecting ring is set for the smallest aperture and intermittent glowing of LED 14a represents a warning signal, namely that the stop preselecting ring must yet be set to its smallest aperture.

Because the camera accepts interchangeable lenses where these may well be of different maximum and minimum apertures, the drive 28 at the stop preselection ring must be individually mounted to a very specific location in each objective. This is shown schematically in FIGS. 3a-3d.

These FIGS. 3a-3d all show the stop preselection ring 27 with a marking 27a and switch 25. The switch is always at the same place in all four figures, as indeed it is always that way in the cameras also.

Figure 3A:
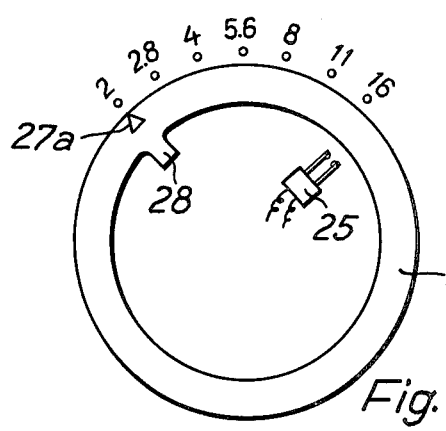
FIG. 3a–3d are detailed diagrammatic showings of the stop-preselection ring of FIG. 1 with drivers for switch actuation.
Figure 3B:
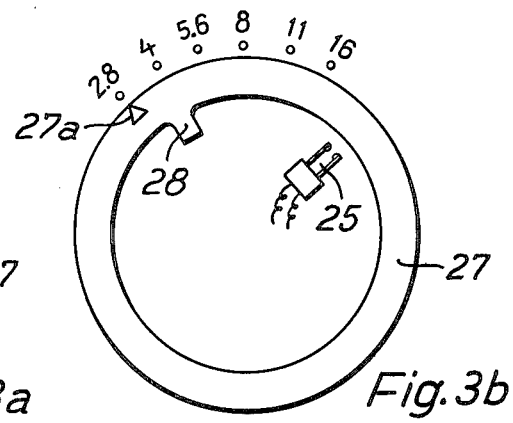
Figure 3C:
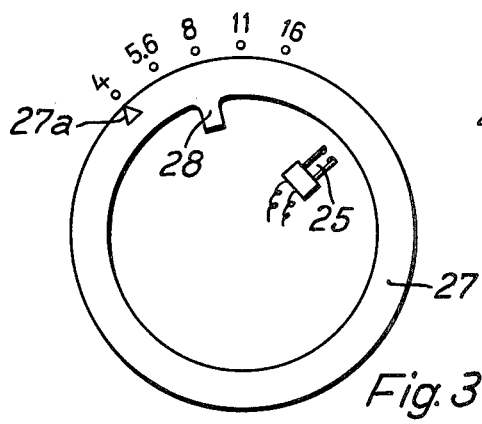

The objectives of FIGS. 3a-3c differ from each other in that the particular next objective is slower by one stop, and they share in common that they all have the same smallest aperture, namely f/16. However, each first stop of each objective is mounted in the camera body in the same purely spatial relative position, it follows that the driver 28 of each objective must be moved closer to switch 25 so that this objective reliably reaches the switch 25 by an angle of rotation less by one stop, and thus closes the switch, when the smallest aperture is being set. FIGS. 3a-3c therefore clearly show that driver 28 is always offset by one stop.

Figure 3D:
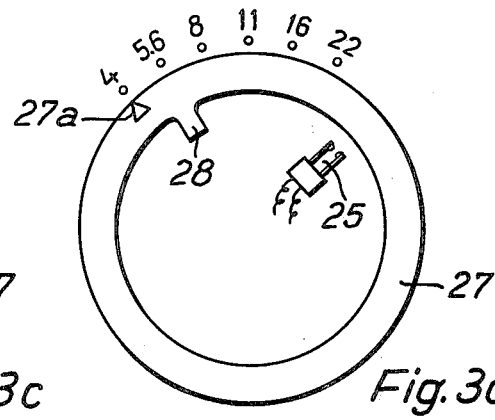

Lastly, FIG. 3d shows an objective with a maximum aperture of f/4, the same as that shown in FIG. 3c, but which also has a smallest aperture smaller by one stop, namely f/22 in lieu of f/16. By adding another stop at the end of the stop scale, the angle of rotation obviously increases by one stop, which means that the driver again must be moved by one step in the direction of the mark, as furthermore shown in FIG. 3d.

As long as all interchangeable lenses have the same smallest aperture and differ only with respect to their maximum apertures, a drive, limit-structure or similar element may be used for driver 28 such as is already present frequently in such objectives, and, as described in German Pat. No. 1,266,636 and U.S. Pat. No. 3,603,204, is used to display the preselected aperture. Such a limit-structure can also be used to close switch 25.

This is impossible, however, when the smallest apertures of these interchangeable lenses are different. In order to use the driver already present to actuate the switch 25, it is proposed to make use of a two-part intermediate member on the side of the camera which shall bridge these different smallest apertures. Such an embodiment is shown in FIGS. 4 and 5.

Figure 4:
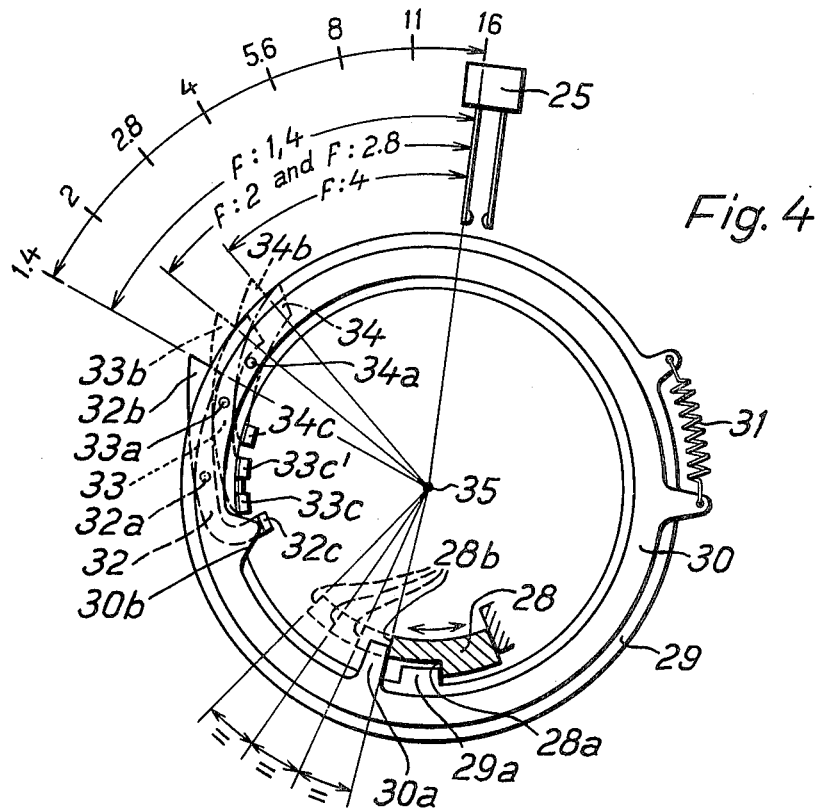
FIG. 4 is a detailed schematic plan view of a two-part intermediate member on the side of the camera of FIG. 1 for switch actuation.

FIG. 4 shows a limit-structure 28 with the two limit-surfaces 28a and 28b. This element 28 is a component of the stop preselecting ring of the objective and upon setting of the stop preselecting ring moves in the direction of the double arrow along a circular path about the optical axis. The pertinent objective and the associated stop preselecting ring are not shown.

Figure 5:
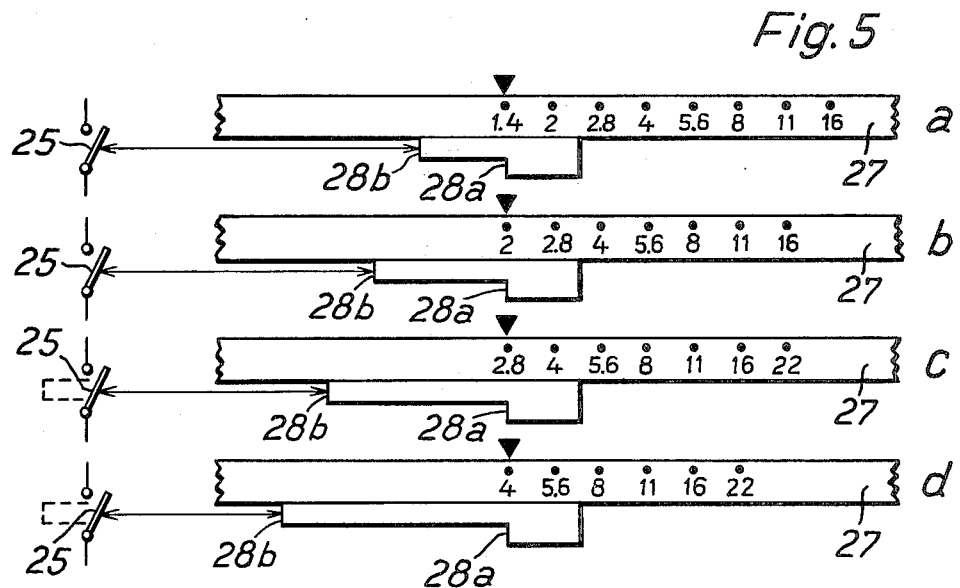
FIG. 5 is an extended schematic view of an aperture preselecting ring actuating the intermediate member of FIG. 4.

With all interchangeable lenses attachable to the camera body and having the maximum apertures preselected, limit-surface 28a is always at the same location with regard to the camera body, and it is always associated with the largest stop of the particular lens, as shown in FIG. 5 in the extended representation. This limit-surface 28a feeds the preselected aperture into the camera's exposure-metering gearing as shown in FIG. 2 of U.S. Pat. No. 3,427,946.

On the other hand, the limit-surface 28b will be differently positioned, depending on the maximum stop of the objective used. This position will change from objective to objective by the amount of aperture stops by which the maximum aperture of the particular objective used differs from the maximum aperture of the fastest objective in this set of interchangeable lenses usable with the camera. This can be seen in FIG. 5. Because of this position of surface 28b associated with the effective aperture, this surface can be used to control an aperture display, as in the camera of German Pat. No. 1,266,636 and U.S. Pat. No. 3,603,234 respectively.

FIG. 5 shows that this limit-surface 28b cannot be used without further ado to close switch 25 if the smallest aperture in slower objectives is reduced by one stop. While it can be seen that the surface 28b closes switch 25 in the objectives with the set of stops f/1.4 to f/16 (row a) or stops f/2 to f/16 (row b), provided the smallest aperture be selected, row c with objectives having stops from f/2.8 to f/22 and row d having stops from f/4 to f/22 show that surface 28b passes beyond the position of switch 25 when the smallest aperture f/22 is preselected (shown in dashed lines). As in the addition of the smaller aperture f/22, the surface 28b must be equally pulled back by one stop in these last cited objectives so that this aperture can be preselected at all. Otherwise the surface 28b would already hit against switch 25 when aperture f/16 is preselected, and a setting to f/22 would be entirely impossible.

This "pulling back" of surface 28b is implemented in that the surface itself does not actuate the switch 25, rather in that it acts on a two-part intermediate member, which only then actuates in turn switch 25. This intermediat4e member is shown schematically in FIG. 4.

This intermediate member consists of two mutually concentric rings 29 and 30 which are biased into their rest position by a spring 31. Both rings are supported inside the front wall of the camera body concentrically with the objective axis 35. Ring 29 is provided with a limit-tongue 29a and ring 30 with a limit-tongue 30a. When the objective is inserted into the camera body, tongue 29a operationally engages surface 28a and tongue 30a operationally engages surface 28b, where 28a and 28b are components of the stop preselecting ring on the side of the objective, as already explained.

Ring 30 furthermore comprises three different drivers constructed as tipping levers 32, 33, 34 and pivotably or tiltingly resting on the ring at 32a, 33a, 34a. Springs omitted from the drawing tip the levers into their non-operative positions when there is no actuation. The tipping levers are so arranged that their drivers 32b, 33b, 34b are always offset by one stop with respect to each other. It is these drivers that actuate switch 25.

The tipping levers furthermore are provided with tongues 32c, 33c, 33c', 34c bent at right angles to the plane of the drawing and also mutually offset by one stop and cooperating with a tongue 30b of ring 30. It is an essential feature that the tipping levers 32 and 34 each are provided only with one tongue 32c and 34c respectively, whereas the middle tipping lever is equipped with two, namely tongues 33c and 33c'.

The operation of this intermediary lever 33 is explained below in relation to FIGS. 4 and 5. Assume first that an objective with widest aperture f/1.4 (=row a of FIG. 5) is attached to the camera. Ring 30 is displaced by its limit-surface 28b by means of tongue 30a until tongue 30b depresses tongue 32c of tipping lever 32, so that driver 32b is tipped into the way and now acts as an operational driver at the ring circumference. It is clear that if the smallest aperture f/16 is preselected at the stop preselecting ring of this lens, driver 32b will precisely hit switch 25 and close it.

If instead an objective with maximum aperture f/2 (=row b of FIG. 5) is attached to the camera, then the surface 28b offset forward by one stop in the direction of advance of the stop preselecting ring rotates forward the tongue 30a and hence ring 30 and hence tongue 30b by one stop, tongue 30b now depressing tongue 33c of tipping lever 33, so that driver 33b appears at the ring circumference. The distance of driver 33b from the switch 25 is less by one stop than that of the previous driver 32b. This ensures therefore that the entire angle of rotation of the stop preselecting ring of this f/2 objective is less than that of the previous f/1.4 objective. Again it is seen that when the smallest aperture is set, namely f/16, at this f/2 objective, the driver 33b precisely closes the switch 25.

Matters are somewhat different, however, when an objective with the maximum aperture of f/2.8 is attached (=row c of FIG. 5). In this objective the surface 28b again is offset forward by one stop. But because this objective's smallest aperture is f/22, the total angle of rotation of the stop preselecting ring equals that of the previous f/2 objective. Because of the forward offset surface 28b, here again the limit-tongues 20a, the ring 30 and tongue 30b are displaced forward by one stop. In the process, tongue 30b moves on tongue 33c'. This tongue 33c' however is a component of tipping lever 33, so that depressing tongue 33c' causes driver 33b to appear at the ring circumference. This driver now is also capable of properly closing the switch 25 after passing through the entire angle of rotation in the case of this f/2.8 objective with additional smaller apertures. This means that even though ring 30 and tongue 30b were displaced by one stop the same driver 33b nevertheless will be operative. Thus the difference between the offset surface 28b and the total angle of rotation of the stop preselecting ring kept constant by adding a further minimum aperture 22 has been compensated for.

If lastly a further objective with maximum aperture f/4 is attached, then the surface 28b again is offset forward by one stop, and tipping lever 34 together with its driver 34b becomes operative by means of the tongue 30b, where driver 34b is closer to the switch 25 by one stop. This is required furthermore because the aperture f/22 is to be kept as the minimum aperture and therefore the total angle of rotation of the stop preselecting ring was reduced by one stop.

Figure 6:
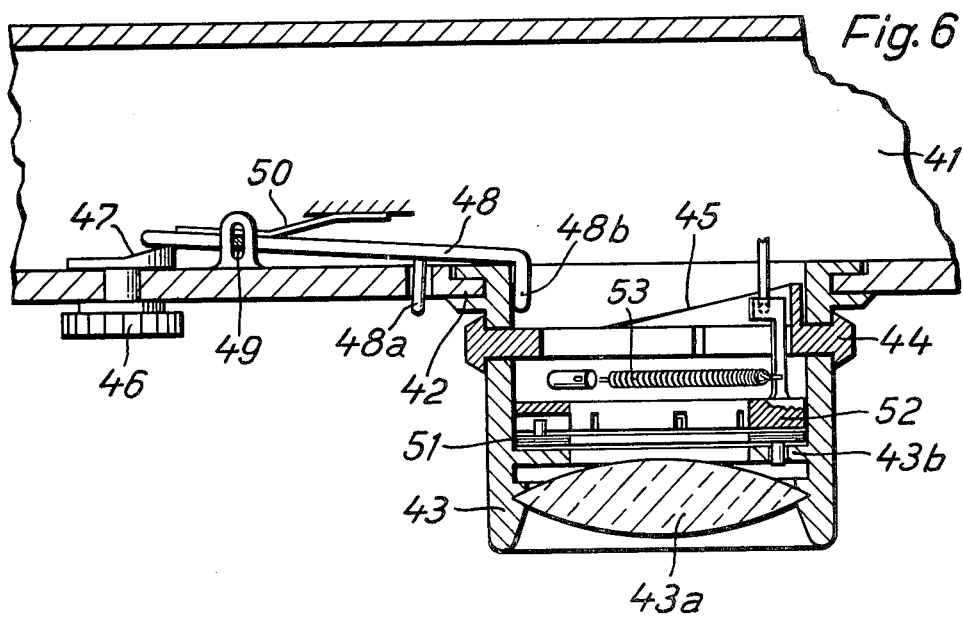
FIG. 6 is a top schematic detailed plan view of a camera of the present invention with a mechanical warning element.

The embodiment shown in FIGS. 1–5 describes the electrical implementation of an electrical warning display. FIG. 6 shows a further mechanical implementation.

Housing 41 of the camera is shown, which holds an objective 43a in a bayonet attachment 43 at its front. Objective attachment is provided with the stop preselection ring 44 to which is mounted a control cam 45 cooperating with the warning device described farther below. The objective is further provided with iris blades 51 confined between blade carrier 43b and diaphragm actuating ring 52. The latter being actuated by the action of a biased coil spring 53. Furthermore an operation mode-selecting switch 46 is mounted to the front of the camera in rotatable manner, said switch also being provided with a control cam inside the camera. These two control cams cooperate with a 2-arm lever 48 which is rotatable at the inside wall of the front camera body in an elongated slot 49. It is biased by a leaf-spring 50 keeping it against control cam 47. Lever 48 is of one piece with pin 48a which can pass outward through a hole in the front side of the camera body. Furthermore the end of lever 48 is made into a right-angle hook 48b cooperating with the control cam 45.

Control cam 45 is arranged so as to correspond to driver 28 of FIGS. 3a–3d, that is, its position at each stop preselection ring of a particular objective depends on its maximum aperture and on its smallest one. The cam arrangement is such that the greatest cam height will always be underneath hook 48b when the smallest aperture was preselected in the attached objective.

Operation of this warning device is as follows: when the user actuates the operation mode selection switch 46 and chooses the "automatic aperture" mode, cam 47 with its highest part passes underneath lever 48 and tips it clockwise. Thereby pin 48a protrudes to the outside through the camera body and warns the user that he has not yet preselected the smallest aperture at the stop preselection ring. If the user now heeds this warning and sets the smallest aperture at the stop preselection ring, control cam 45 slips underneath hook 48b and lifts lever 48 at that location, whereby pin 48a is retracted and the user now knows that the camera is ready for the operation mode selected.

We claim:

1. Single lens mirror reflex camera having a housing, an objective, a calibrated stop preselection ring, a spring biased diaphragm, an exposure metering system and a control system including a central operation mode selection switch with a plurality of mode settings including "automatic aperture" mode and a warning display, the improvement comprising first switching means provided at said camera which are switched in when selecting said "automatic aperture" operation mode and are recognized as said warning display by the user, and second switching means are provided at said stop preselection ring of said objective and at said camera, which switch out said first switching means in said camera when the smallest aperture setting is selected at said stop preselection ring.

2. The single lens mirror reflex camera of claim 1 wherein said warning display is mechanical means visible at the camera housing or in the viewer, and said second switching means connected to said stop preselection ring is mechanical and cooperates with said warning display of the camera proper.

3. The single lens mirror reflex camera of claim 2, wherein said warning display consists of a pin supported by a double-arm lever and projecting through the wall of said camera to the outside when in its switched in position, and one of the lever ends cooperates with a first control cam of said operation mode selection switch so that when "automatic aperture" mode is selected, said pin is forced out of said camera housing, whereas the other end of the lever cooperates with a second control cam of said stop preselection ring so that when the smallest aperture is preselected, pin is forced back into said housing.

4. The single lens mirror reflex camera of claim 3, having interchangeable objectives with respective stop preselecting rings for different maximum apertures which upon being set to the maximum aperture assume the same position relative to the camera and which offer a different number of stops, each stop preselecting ring of each interchangeable objective having a control member cooperating with said mechanical warning display at the camera, said control member mounted in such a manner that the angular distance of said control member from said warning elememt in the case of preselected maximum aperture is always equal to the total angle of rotation of said stop preselecting ring.

5. The single lens mirror reflex camera of claim 4, wherein a rotatable ring concentric with the axis of said objective is provided at said camera as an intermediate member between said control member and said warning diaplay.

6. The single lens mirror reflex camera of claim 5, wherein a first limit-surface is solidly connected with said stop preselecting ring of said interchangeable objectives, the position of said first limit-surface with respect to said camera and regardless of the maximum aperture of the particular objective always being the same when the maximum aperture is preselected, and wherein said stop preselecting ring is solidly connected to a second limit-surface, the position of which relative to said camera always is the same for all objectives regardless of the differences in their maximum apertures provided the same aperture be selected in these individual objectives, said second limit-surface defining a control surface for the indirect actuation of said mechanical warning element, and said intermediate member at the camera is divided into two parts of which the first part is displaced by said first limit-surface and the second part by said second limit-surface, said first part further comprises several movable drivers which can be switched in and out and which are offset by one stop with respect to each other and act on said warning element, and said second part is provided with a fixed driver which upon relative adjustment of said first and second parts switches in said movable drivers, and at least one of said movable drivers is switched by two adjacent but different positions of said fixed driver.

7. The single lens mirror reflex camera of claim 6, wherein said intermediate member consists of first and second concentric rings which are rotatable with respect to each other and which are kept in an initial position by a spring or are returned into said position by it in the absence of action of said limit-surfaces of the objective on said rings, said first ring supports said movable drivers being part of tipping levers and said second ring comprises said fixed driver.

8. The single lens mirror reflex camera of claim 7, wherein said tipping levers are double arm levers.

9. The single lens mirror reflex camera of claim 1, wherein said operation mode selected is displayed in or at the viewer field of the camera by insertion of a corresponding light emitting diode, said first switching means provided at said camera is a frequency generator having a potential controlling the base of a transistor in a circuit having an LED displaying "automatic aperture" operation mode, and said second switching means provided at said stop preselecting ring is a driver closing a switch shunting a transistor when said stop preselecting ring is set for the smallest aperture.

10. The single lens mirror reflex camera of claim 9, having interchangeable objectives with respective stop preselecting rings for different maximum apertures which upon being set to the maximum aperture assume the same position relative to the camera and which offer a different number of stops, each stop preselecting ring of each interchangeable objective having a control member cooperating with said switch at the camera, said control member mounted in such a manner that the angular distance of said control member from said switch in the case of preselected maximum aperture is always equal to the total angle of rotation of said stop preselecting ring.

11. The single lens mirror reflex camera of claim 10, wherein a rotatable ring concentric with the axis of said objective is provided at said camera as an intermediate member between said control member and said switch.

12. The single lens mirror reflex camera of claim 11, wherein a first limit-surface is solidly connected with said stop preselecting ring of said interchangeable objectives, the position of said first limit-surface with respect to said camera and regardless of the maximum aperture of the particular objective always being the same when the maximum aperture is preselected, and wherein said stop preselecting ring is solidly connected to a second limit-surface the position of which relative to said camera always is the same for all objectives regardless of the differences in their maximum apertures provided the same aperture be selected in these individual objectives, said second limit-surface defining a control surface for the indirect actuation of said switch and said intermediate member at the camera is divided into two parts of which the first is displayed by said first limit-surface and the second part by said second limit-surface, said first part further comprises several movable drivers which can be switched in and out and which are offset by one stop with respect to each other and act on said switch, and said second part is provided with a fixed driver which upon relative adjustment of said first and second parts switches in said movable drivers, and at least one of said movable drivers is switched by two adjacent but different positions of said fixed driver.

13. The single lens mirror reflex camera of claim 12, wherein said intermediate member consists of first and second concentric rings which are rotatable with respect to each other and which are kept in an initial position by a spring or are returned into said position by it in the absence of action by said limit-surfaces of the objective on said rings, said first ring supports said movable drivers being part of tipping levers and said second ring comprises said fixed driver.

14. The single lens mirror reflex camera of claim 13, wwherein said tipping levers are double arm levers.

* * * * *